United States Patent Office 2,947,398
Patented Aug. 2, 1960

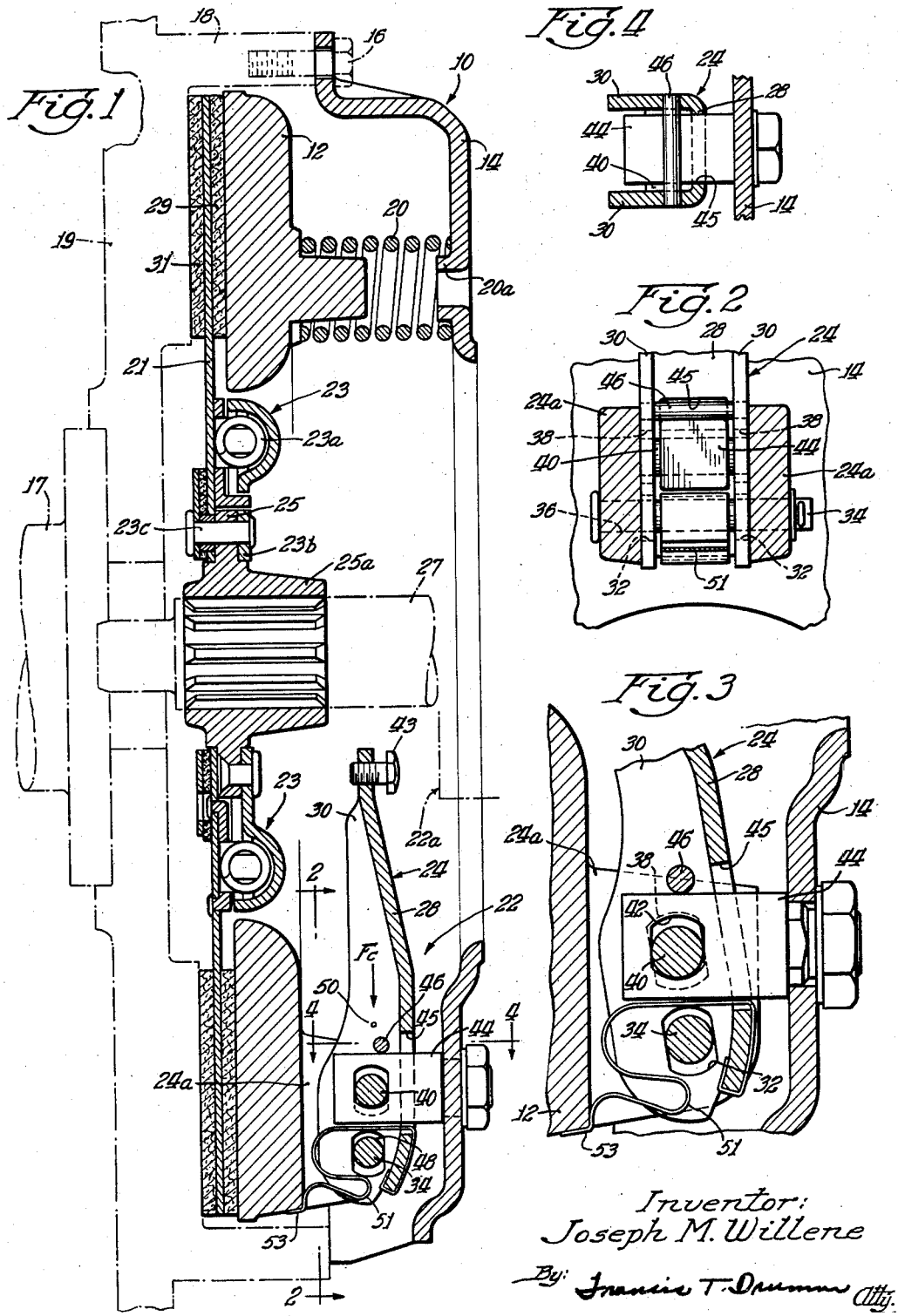

2,947,398
CLUTCH RELEASE LEVER

Joseph M. Willene, Rockford, Ill., assignor to Borg-Warner Corporation, Chicago, Ill., a corporation of Illinois Filed July 3, 1957, Ser. No. 669,743

3 Claims. (Cl. 192—99)

This invention relates to clutches and more particularly to a clutch release lever assembly for clutches of the pressure plate type.

This invention is primarily directed to a release lever apparatus embodying a plurality of circumferentially spaced lever assemblies each having a radially extending lever movable radially outwardly to a limited extent due to centrifugal force incident to rotation.

Heretofore, clutch lever release assemblies of this type have been characterized by the tendency of the innermost ends of the levers to be biased towards the release bearing during rotational conditions. This condition was due to the fact that the center of gravity of each lever resided at a point located between the conventional centrifugal pivot point and the inoperative position of the release bearing. As a result, the release levers had a tendency to pivot towards the release bearing and to engage the surface thereof with consequent scuffing and abrasion.

A primary object of this invention is, therefore, to provide a clutch mechanism of the type described wherein the release levers are biased out of engagement with the release bearing when the levers are under the influence of centrifugal force during operation.

A further object of the invention is to provide a clutch apparatus of the mentioned character in which a pressure plate releasably engages a driven plate even after a predetermined degree of wear, and in which the positions of the several levers are controlled by the provision of stop means operative only at rotational speeds at which a predetermined degree of centrifugal force occurs.

Another object of the invention is to provide a release mechanism for a clutch of the pressure plate type in which a plurality of circumferentially spaced levers are arranged radially of the pressure plate for actuation axially by a release bearing and in which each of the levers is provided with a pair of elongated slots at the outer end thereof for reception of pivot pins to afford effective operation under severe conditions and in which means are provided for controlling the radially outward movement of the levers so that the center of gravity of each lever resides between this pivot point and the pressure plate with the result that the inner end of each of the levers is biased away from the release bearing when under the influence of centrifugal force.

These and other objects and features of this invention will become apparent from the following description when taken with the accompanying drawings, in which the same reference characters are employed to refer to the same parts and in which:

Figure 1 is an elevational sectional view of a clutch made in accordance with the present invention;

Figure 2 is an elevational sectional view taken substantially on line 2—2 of Figure 1;

Figure 3 is an enlarged fragmentary vertical sectional view of the lever assembly of the clutch of Figure 1, showing the lever in the position it assumes when under the influence of centrifugal force; and Figure 4 is a sectional plan view taken substantially on line 4—4 of Figure 1.

Referring now to the drawing and more particularly to Figure 1, the clutch apparatus of the present invention is indicated generally by reference numeral 10 and includes a driving pressure plate 12 mounted for rotation with a housing 14 which is secured by circumferentially spaced screws 16 to an outwardly projecting flange 18 of a flywheel 19 (shown in dot-and-dash lines) which, in turn, is connected to shaft 17 of a power source, such as an internal combustion engine or the like. A driven plate 21 is yieldably secured to a vibration dampening assembly 23 of which includes a plurality of compression springs 23a and an inwardly extending radial flange 23b, secured by means of spaced rivets 23c to a radially outwardly extending flange 25 integrally formed with a hub 25a. The hub 25a is suitably keyed to an output shaft 27 (shown in dot-and-dash lines). An annular friction facing 29 is interposed between the driving plate 12 and the driven plate 21, and a friction facing 31 is interposed between the plate 21 and the confronting face of the flywheel 19 so that frictional engagement is afforded on both sides of the plate 21 when the plate 12 is biased to the left, as viewed in Figure 1, by circumferentially spaced compression springs 20, each of which is maintained in fixed position on the housing 14 by a stamped boss 20a.

Disengagement of the pressure plate 12 from the driven plate 21 may be effected by a releasing mechanism which includes a plurality of circumferentially spaced release assemblies 22 (only one of which is shown on the drawing), which are actuated by axially slidable release apparatus including a release bearing 22a (shown in dot-and-dash lines). One of the release assemblies 22 will now be described in detail.

Each of the assemblies 22 includes an elongated radially extending lever 24 mounted for pivotal movement on a pair of lugs 24a connected to the back face of the pressure plate 12. As shown best in Figures 2 and 4, each lever 24 has a body portion 28 and a pair of oppositely disposed parallel flanges 30 which are provided at their lower ends with an elongated slot 32 for reception of a pin 34, the ends of which are received in registering bores 36 in the lugs 24a. Each of the flanges 30 is further provided with an elongated slot 38 slightly offset from the slot 32. As seen best in Figure 2, a pivot pin 40 is received in the complementary slots 38 and passes through an elongated slot 42 in a pivot block 44 which is secured to the housing 14, and extends through an opening 45 in the body portion 28 of the lever 24. The pin 40 forms a fulcrum for pivotal movement of the lever 24 in a counterclockwise direction about the axis of the pin 40 when the release bearing 22a is moved to the left, as viewed in Figure 1, and engages an adjusting screw 43 at the inner end of each lever for disengaging the plate 12 from the plate 21 as previously explained.

When the clutch was engaged and rotating, the levers 24 had a tendency to pivot in a clockwise direction about 48 on the pin 34 since the line of action Fc of the centrifugal force acting on the levers 24 passed through center of gravity 50 in an axial plane disposed between the point 48 and the release bearing 22a. As a result, the screws 43 engaged the bearing 22a and undesirable scuffing and abrasion occurred.

According to the present invention, means are provided for effecting biasing of the levers 24 so that the inner ends are inclined away from the release bearing when the clutch is in operation. In the present instance, a pin 46 is interposed between the several flanges 30 so that movement of the lever 24 to its outermost radial position is precluded. The outward movement of the lever 24 is limited by engagement of the pin 46 with the upper surface of the pivot block 44. In the absence of the pin 46 the lever 24 would move radially outwardly so that the surface of the pin 34 at 48 would form a pivot point for movement of the lever 24 under the influence of centrifugal force. It will be noted that a spring 51 is connected at 53 to the outer periphery of the plate 12, extends between the pin 34 and the pin 40 and has a portion extending through the opening 45 in the lever 24 and thence around the lower edge of the lever 24 and bears against the lower marginal edge of the inner surface of the lever. The spring 51 tends to urge the lever 24 to its inner radial position, and biases the lever so that the inner end is urged towards the right, as viewed in Figure 1. By this arrangement, the levers 24 tend to return to the posititon shown after the bearing 22a is retracted. It will be appreciated that the centrifugal force incident to rotation of the several levers greatly exceeds the value of the spring 51.

The pin 46 is so positioned that the lever 24 no longer can pivot under the influence of centrifugal force about point 48 of the pin 34. The center of gravity 50 now resides between the auxiliary pivot point and the axial plane of the axis of the pin 34. The effective moment of force of Fc passing through a plane located to the left of the pin 46 tends to rotate the lever 24 in a counter-clockwise direction so that the inner ends are biased away from the release bearing 22a.

In operation, upon engagement of the pressure plate 12 with the driven plate 21, the several levers 24 move radially outwardly under the influence of centrifugal force until the pin 46 engages the upper surface of the pivot block 44. This engagement limits further radial movement of the levers and prevents engagement of the point 48 on the pin 34 with the adjacent arcuate edge of the slot 32. As a result, the several levers 24 tend to rotate so that the inner ends thereof are biased towards the friction plates and away from the release bearing. When the levers are moved in the release direction by the release bearing, the pin 46 moves away from the pivot block 44 and the lever 24 is then pivoted about the pin 40.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. In a clutch having an axially fixed rotatable plate, an axially movable rotatable pressure plate, a plurality of circumferentially spaced release assemblies selectively actuatable by an axially slidable release bearing, each of said release assemblies including a pivotally mounted lever capable of limited movement radially outwardly, the improvement comprising means for controlling the direction of movement of said levers while under the influence of centrifugal force so that movement of the inner ends of said levers towards said release bearing is precluded, said means including a stop in each assembly for limiting the radial movement of the lever thereof.

2. In a clutch having an axially fixed rotatable plate, an axially movable rotatable pressure plate normally resiliently urged into engagement with said axially fixed plate, a plurality of circumferentially spaced release assemblies for said pressure plate, each of said release assemblies having an elongated radially extending lever mounted for pivotal movement about a first pivot point, the inner ends of each of said levers being selectively engageable by an axially slidable release bearing for movement of said pressure plate away from said fixed plate, the improvement comprising a stop for each of said levers, said stop being operable to control the movement of said levers so that movement of the inner ends of said levers towards said release bearing while under the influence of centrifugal force is precluded.

3. In a clutch including friction elements relatively movable axially with respect to each other for effecting clutch engagement and disengagement, a plurality of circumferentially spaced release assemblies carried by one of said elements, each of said assemblies having an elongated pivotally mounted lever selectively engageable by an axially slidable release bearing to afford the relative axial movement, said levers being provided with last-motion slots affording limited radial movement and being biased to their innermost positions, the improvement comprising means for controlling pivotal movement of said levers under rotational conditions, said means including a pin carried by each lever for limiting radially outwardly movement of each lever and forming a stop so that movement of the inner ends of the levers towards said release bearing is precluded.

References Cited in the file of this patent

UNITED STATES PATENTS

| | | |
|---|---|---|
| 1,978,658 | Wemp | Oct. 30, 1934 |
| 2,801,723 | Binder | Aug. 6, 1957 |
| 2,818,952 | Ross | Jan. 7, 1958 |